Patented Sept. 19, 1972

3,692,692
REJUVENATION OF DAMAGED ZEOLITE-SUPPORTED METAL CATALYSTS

John W. Ward, La Habra, and Danford E. Clark, Fountain Valley, Calif., assignors to Union Oil Company of California, Los Angeles, Calif.
No Drawing. Filed Oct. 29, 1970, Ser. No. 85,241
Int. Cl. B01j 11/18, 11/08, 11/30
U.S. Cl. 252—412
12 Claims

ABSTRACT OF THE DISCLOSURE

Siliceous zeolite catalysts comprising zeolitic mono- and/or divalent metal cations and a non-zeolitic Group VIII metal hydrogenating component supported thereon, which catalysts have undergone damage by thermal and/or hydrothermal stresses resulting in a maldistribution of the metal components, are rejuvenated in activity by a sequential treatment with an aqueous ammonium salt to exchange out at least a portion of the zeolitic mono- and/or divalent metal ions, and with aqueous ammonia to effect a redistribution of the Group VIII metal. The treatments may be performed in either order.

BACKGROUND AND SUMMARY OF INVENTION

It is well known that maximum activity of the Group VIII metals for hydrogenation reactions depends upon maintaining the metal in a finely divided state such that there is a maximum ratio of surface area to mass. Perhaps the most common method of achieving a high degree of dispersion involves impregnating salts of the Group VIII metals upon porous solid supports, followed by drying and decomposing of the impregnated salt. On non-zeolitic supports, the drying and calcining operations often bring about a substantial migration and agglomeration of the impregnated metal, with resultant reduction in activity. In more recent years, with the advent of highly active crystalline zeolite catalysts of the aluminosilicate type, it has become common practice to ion-exchange the desired metal salt into the zeolite structure in an attempt to achieve an initial ionic bond between each metal atom and an exchange site on the zeolite, thus achieving the ultimate in dispersion of metal while also bonding the metal to the zeolite in such manner as to minimize migration and agglomeration during the drying and calcining steps, during which at least a portion of the metal is oxidized and converted to a non-zeolitic form. This ion exchange technique is particularly desirable in the case of dual-function catalysts such as hydrocracking catalysts wherein it is desirable to maintain an active hydrogenating site closely adjacent to an acid cracking site. These efforts have met with varying degrees of success.

Even though the above described ion-exchange techniques can give a high degree of initial dispersion of Group VIII metal on the support, conditions encountered during subsequent use of the catalyst may bring about a maldistribution of the metal with resultant reduction in activity, entirely independent of normal deactivating phenomena such as coking, fouling, poisoning, etc. Overheating, or contact with excessive partial pressures of water vapor at high temperatures, such as may occur during oxidative regeneration of the catalyst or during prolonged contacting with hydrocarbon feedstocks, may bring about migration of the active metal away from the exchange sites, and this migration may, under particularly severe conditions, ultimately result in macro-agglomeration of the metal into crystallites of 100–200 A. or more in diameter. This particular type of damage is most apt to occur under oxidizing conditions at temperatures of 500–950° F. where high partial pressures of water vapor are present.

The process of this invention is particularly directed to correcting non-zeolitic Group VIII metal maldistribution resulting from thermal and/or hydrothermal stresses encountered by the catalyst in normal usage, regeneration, or during accidental upsets entailing uncontrolled temperatures and/or water vapor partial pressures. Normally these stresses bring about a maldistribution of active metal short of extensive agglomeration to particle sizes larger than about 50 A. For example, metal atoms or aggregates initially located closely adjacent to active exchange sites on the carrier may migrate to other less active areas, thus reducing the statistical likelihood of conjoint action on the feedstock molecules of both an acidic cracking site and a hydrogenation site. Further migration may tend to drive the metal deeper into the support structure, or into pore structures which are relatively inaccessible by feed molecules, all resulting in reduced overall hydrogenation activity.

Limited migration of these types may occur when the catalyst, in a sulfided condition (as e.g., in normal use for hydrocracking), or in an oxidized state (as during regeneration), comes into contact for more than about 30 minutes with water vapor of greater than about 10 p.s.i. partial pressure at temperatures above about 500° F. Extended contacting under these conditions, orat extremely high partial pressures of water vapor, e.g., above about 100 p.s.i., can ultimately lead to macro-agglomeration of the type previously described. If this should occur, the rejuvenation procedure of this invention in some cases is less effective per se, but can in any case be advantageously utilized following partial redispersal of the agglomerated metal by, for example, the methods described in U.S. Pats. Nos. 3,197,399 and/or 3,287,257. The processes described in these patents, involving respectively, alternating oxidation-reduction cycles, and alternating sulfiding-oxidation cycles, can bring about a substantial redispersion of agglomerated metal into particles of less than about 50 A. diameter, but do not in most instances bring about a complete recovery of the fresh catalyst activity. The process of this invention is designed to achieve at least a complete recovery of fresh activity; but in nearly all cases it is found that the rejuvenated catalysts actually exhibit greater than fresh activity.

In the case of catalysts which originally contained a difficultly reducible zeolitic monovalent and/or divalent metal such as sodium, calcium, magnesium, nickel, manganese or the like, it has been found that the above described conditions encountered during use of the catalyst also appear to bring about, in addition to migration of the non-zeolitic hydrogenating metal, a detrimental redistribution of the zeolitic metal cations. Residual zeolitic metal cations, particularly sodium, are believed to occupy mainly the relatively unavailable exchange sites in the hexagonal prisms and sodalite cages of the original zeolite structure, but under the described conditions of use, migration to more active cracking sites appears to occur with resultant loss in cracking activity. Divalent metal cations such as the alkaline earth metals, which may have been originally exchanged into the zeolite to achieve hydrothermal stability, may also migrate to undesirable sites, and in any even appear after extended use of the catalysts under the described conditions to be no longer necessary for stabilization, the anionic zeolite structure having acquired stability by virtue of the thermal and/or hydrothermal conditions which brought about the cation migration. It is hence desirable in the case of these damaged catalysts to remove zeolitic mono- and/or divalent metal cations, in addition to redistributing the non-zeolitic Group VIII metal hydrogenating component. The former is accomplished by ammonium ion exchange; the latter by the ammoniation step.

As employed herein, the term "non-zeolitic metal" refers to the metal content of the catalyst, other than anionic lattice metals such as aluminum, which is not chemically bonded to the anionic exchange sites of the zeolite, while conversely, "zeolitic metal" refers to the metal content which is so bonded. The easily reducible metals such as the Group VIII noble metals are normally present primarily as non-zeolitic metal, as a result of previous reduction with hydrogen, oxidation and/or sulfiding treatments. The difficultly reducible metals such as the alkali and alkaline earth metals are normally present almost exclusively as zeolitic cations, since they are not affected by the normal reduction, oxidation or sulfiding treatments. Metals of intermediate reducibility such as nickel, copper and the like may be present in both zeolitic and non-zeolitic form.

Briefly stated, the complete rejuvenation procedure of this invention involves two essential steps performed sequentially in either order:

(1) An aqueous ion exchange treatment with an ammonium salt solution to effect replacement of at least a portion of the detrimental zeolitic mono- and/or divalent metal cations with ammonium ions, thereby increasing the cracking activity; and (2) A treatment with ammonia and water to redistribute the non-zeolitic Group VIII metal, thereby increasing the hydrogenation activity.

The sequence of ammoniation followed by ion exchange is preferred because a more active catalyst is usually obtained than by the opposite sequence.

While we do not wish to be bound by any theoretical explanation of the results achieved herein, it appears that the ammoniation step involves a reconstitution of the original ion-exchange cationic species of the hydrogenating metal, or the soluble metal ammino-hydroxide, in the pores of the catalyst by treatment with aqueous ammonia. Hydration and ammoniation of the deactivated catalyst, in which the Group VIII metal is in an oxidized or sulfided form, fills the micropores with a strong aqueous ammonia solution. This results in dissolution of the Group VIII metal oxide or sulfide in the ammonia solution to form the original cationic species, or soluble ammino-hydroxide, which was originally ion-exchanged into the zeolite. For example, palladium oxide on the zeolite support will form the $Pd(NH_3)_4^{++}$ ion, which then migrates back to the original ion exchange sites. The original distribution of palladium is then theoretically obtained after drying and recalcining as in the original catalyst preparation method. Similarly, platinum oxide on amorphous silica- alumina will form $Pt(NH_3)_4(OH)_2$ or

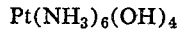
$$Pt(NH_3)_6(OH)_4$$

which, being stronger bases than $NH_4OH$, will tend to combine with the original acid sites on the support. The original distribution of platinum with respect to acid sites will then theoretically be obtained after drying and calcining.

Irrespective of the correct theoretical explanation for the results achieved herein, the experimental evidence available indicates that the procedures described herein can give complete rejuvenation of zeolite-based Group VIII metal catalysts wherein a maldistribution of metals has occurred as a result of overheating, or of contacting the catalyst while in an oxidized or sulfided state with water vapor at temperatures between about 500° and 1200° F.

DETAILED DESCRIPTION (A) Hydration-ammoniation

This portion of the rejuvenation may be carried out by any desired procedure which will give a substantial adsorption of water into the micro-pores of the catalyst and absorption-solution of a substantial proportion, at least about 5 weight-percent and preferably 10 to 35 weight-percent, of ammonia into the adsorbed water phase, based on the weight of the water phase. Preferably, the catalyst is first hydrated and then ammoniated, but simultaneous hydration and ammoniation is also contemplated. Simultaneous hydration and ammoniation can be effected by wetting the catalyst with an aqueous ammonia solution. In the preferred procedure, the catalyst is simply hydrated in moist air to an extent of e.g., 5–40 weight-percent, and then contacted with gaseous ammonia until the liquid water phase is substantially saturated with ammonia. The hydration and ammoniation steps are preferably carried out at temperatures between about 0° and 150° F., but temperatures up to about 300° F. or even higher are contemplated. Normally these steps are carried out at atmospheric pressure, but reduced or superatmospheric pressures may be utilized.

For treating large batches of catalyst, it is normally desirable to hydrate by passing moist air or other wet gas through a bed of the catalyst until there is a substantial breakthrough of water vapor in the effluent gases. Ammoniation may be similarly effected by passing ammonia, or ammonia-containing gases through the bed until ammonia appears in the off gases. Simultaneous hydration and ammoniation can be effected by passing a gas stream containing both ammonia and water vapor through the catalyst bed until both water vapor and ammonia appear in the off gases.

In any of the above procedures, it will be understood that in cases where the zeolite base is in a hydrogen or "decationized" form, the ammoniation will at least partially convert the zeolite to an ammonium zeolite, in addition to saturating the adsorbed water with ammonia. The dissolved ammonia and the zeolitic ammonium ions are removed during the final drying and calcining steps described hereinafter.

Normally the desired redistribution of active metal on the zeolite base takes place rapidly, i.e., within about 10–30 minutes following hydration and ammoniation, and hence the drying and calcining steps can be commenced substantially immediately thereafter. However, in some cases, as for example where a substantial agglomeration of metal has occurred, it may be desirable to age the catalyst in its hydrated-ammoniated form for periods ranging from about one hour to twelve hours or more.

Regardless of whether the ammonation step is performed before or after the ammonium ion exchange step, it is ordinarily necessary to convert the hydrated-ammoniated catalyst to a dehydrated, deammoniated, oxidized form. These objectives can be achieved with difficulty by a carefully controlled rapid heatup to, e.g., 950° F. in air, but to achieve maximum catalytic activity in this manner would be a practical impossibility. The reason for this stems from the observed fact that at temperatures between about 500° and 950° F. the Group VIII metal on the catalyst, when in an oxidized state, tends to undergo severe agglomeration unless the water vapor partial pressure is carefully controlled. Hence, a rapid heatup in air would tend to raise the catalyst temperature to above 500° F. before some portions of the catalyst bed (or even some areas of each catalyst pellet) had been sufficiently dehydrated to permit control of localized water vapor concentrations. In general, in order to avoid agglomeration of oxidized metal on the catalyst in the 500–950° F. temperature range, it is desirable to maintain water vapor partial pressures below about 10 p.s.i., and preferably below 2 p.s.i. It is therefore highly desirable to reduce the water content of the catalyst to a practical minimum at temperatures below 500° F., for at temperatures above about 500°F. the catalyst is rapidly being converted to an oxidized state with chemical evolution of water. At below about 500° F., the metal or metal oxide is not affected by water vapor.

Accordingly, for the above purposes, a preferred drying step is carried out by passing a stream of air or other non-reducing gas through a bed of the catalyst without maintaining dewpoint control over the effluent gases. It is generally preferable to start the drying at a low temperature of e.g., 100° to 200° F., and incrementally raise the stripping gas temperature to a level in the 300° F. to 500° F. range. During the drying step, nearly all of the ammonia absorbed into the water phase in the catalyst is removed, any remaining ammonia being primarily in the form of zeolitic ammonium cations. It is this zeolitic ammonium which creates an additional problem of water vapor partial pressure control during the subsequent calcination step, for it is during this step that zeolitic ammonium is oxidized to form additional water vapor (and nitrogen), which adds its effect to that of the water vapor generated by desorption of any remaining water in the catalyst. Hence the desirability of stripping out at least about one-half, and preferably at least about two-thirds, of the adsorbed water during the drying step at temperatures below about 500° F.

It is to be noted also that reducing gases such as hydrogen should be substantially absent during the drying step. For reasons which are not clearly understood, direct reduction of the complex metal ammine cation to the free metal always results in servere agglomeration thereof. Hence the necessity for first converting the metal ammino complex to an oxidized state during the calcining step, and then later reducing the oxidized metal to activate the same for use in hydrocarbon conversions. Suitable stripping gases for use in the drying step include air or other oxygen-containing gases, nitrogen, argon, methane and the like. The drying is normally carried out at atmospheric pressures, or slightly elevated pressures of e.g., 50 to 100 p.s.i.g. Where crystalline zeolite catalysts are concerned, it is normally desirable to reduce the water content to about 5–10 weight-percent.

The calcination step may be performed in the same apparatus employed for the drying step if desired, e.g., in a rotary kiln, a moving belt furnace, or in a vessel containing a fixed bed of the catalyst. To initiate the calcination, air is admixed with the stripping gas, initially in small proportions to provide an oxygen concentration of e.g., about 0.1% to 1% by volume. The temperature of the calcination gas is then gradually increased from about 500° F. to 700–750° F. while gradually increasing the oxygen concentration to e.g., about .5% to 2%. During the entire heatup period, water concentration in the calcination vessel should be carefully controlled, as by monitoring the effluent gases to maintain a dewpoint below about 40° F., preferably below 20° F. Following each incremental increase in oxygen concentration it is generally desirable, in the case of fixed bed calcinations, to wait for the exothermic temperature wave to pass through the catalyst bed and until oxygen breakthrough has occurred before the next incremental increase in oxygen concentration is effected. Continuing in this manner, inlet gas temperatures and oxygen concentrations are increased until temperatures of about 900° to 1100° F. and final oxygen concentrations in the range of about 2–10% or more are reached. When the terminal temperature and oxygen concentrations are reached, the calcination is then preferably continued for a sufficient length of time to give an effluent gas stream having a dewpoint below about 0° F., preferably below about −20° F.

The gradual heatup procedure with incremental increases in oxygen concentration as described above is a practical necessity when the calcination is carried out with a fixed bed of catalyst through which the calcination gases are passed. It is not intended however that the invention be limited to this procedure, for a considerably more rapid heatup at high oxygen concentrations can be utilized when the catalyst is arranged in thin layers through which the gases pass, whereby the effect of water vapor on downstream portions of the catalyst is minimized. Commercially, a rotary kiln equipped with lifters and a dry air sparger to provide good ventilation of the cascading bed of catalyst is very effective in achieving the desired results of this invention. A particularly critical period during the calcination appears to be the period of burnoff of zeolitic ammonium ions, which occurs primarily at temperatures above about 750° F. and can generate a burning wave in the catalyst wherein instantaneous temperatures and water vapor concentrations may inhibit full recovery of the original fresh catalyst activity. Accordingly, greatest care should be exercised to minimize water vapor concentrations during the 750°–1000° F. heating cycle.

(B) Ammonium ion exchange

Ion exchange with ammonium ions may be carried by conventional procedures which involves in general contacting the catalyst with an aqueous solution of any desired ammonium salt, e.g., the nitrate, sulfate, chloride, acetate, or the like. Preferably ammonium nitrate is employed, and preferred salt concentrations range between about 5% and 50% by weight. Practical contacting temperatures range between about 10° and 100° C., preferably 20–90° The lower temperatures of about 20–40° C. are preferred from the standpoint of minimizing the leaching out of Group VIII metal from the catalyst, although higher temperatures give more rapid exchange. The ion exchange efficiency is further enhanced by acidifying the exchange solution to a pH of about 3–5.5 with an acid, e.g., acetic acid.

The contacting may be carried out in a single stage, in plural batch stages, or continuously by flowing a stream of the ammonium salt solution through a bed of the catalyst. Normally it is desirable to control the severity, or use the number of stages required, to remove at least about 50%, preferably at least about 75%, of the total zeolitic mono- and divalent metal content.

Following the ion exchange step, the catalyst is washed to remove residual salts, and, if the ammoniation step was carried out prior thereto, is subjected to final drying and calcining as previously described. However, if the exchange step is performed first, the catalyst need only be dried to the desired water content prior to ammoniation, although in some cases better overall activity is obtained if an interventing calcination is performed.

(C) Catalyst compositions

Catalyst compositions which may be rejuvenated by the above procedures include hydrogenation catalysts, hydrocracking catalysts, isomerization catalysts, reforming catalysts and the like which comprise a Group VIII metal, with or without other metals or metal oxides such as those of the Group VI–B metals, supported on a siliceous zeolite base having an ion exchange capacity of at least about 0.01 meq./gm., and preferably at least about 0.1 meq./gm. Suitable siliceous zeolite bases include for example the crystalline aluminosilicate molecular sieves such as the Y, X, A, L, T, $\Omega$, and B crystal types, as well as zeolites found in nature such as for example mordenite, stilbite, heulandite, ferrierite, dachiardite, chabazite, erionite, offretite, and the like. The preferred crystalline zeolites are those having crystal pore diameters between about 7–15 A., wherein the $SiO_2/Al_2O_3$ mole ratio is about 3/1 to 10/1. For most catalytic purposes, e.g., catalytic hydrocracking, it is preferable to replace most or all of the zeolitic sodium normally associated with such zeolites with other cations, particularly hydrogen ions and/or polyvalent metal ions such as magnesium, calcium, zinc, rare earth metals and the like.

The utilitarian effect of the ammonium ion exchange treatment of this invention is most evident in the case of catalysts containing significant proportions, e.g., 0.5–10% by weight, of zeolitic mono- and/or divalent metal ions, particularly the metals of Groups I–A, II–A and II–B, e.g., sodium, potassium, calcium, magnesium, zinc, etc., as well as iron, cobalt, nickel and the like.

In addition to the crystalline zeolite bases described above, other zeolitic bases may be employed such as the zeolitic cogels of silica and alumina, silica and titania, silica and zirconia, silica and magnesia and the like.

The Group VIII metal hydrogenating component is ordinarily added to the zeolite base by ion exchange with an aqueous solution of a suitable compound of the desired metal wherein the metal is present in a cationic form, as described for example in U.S. Pat. No. 3,236,762. Suitable amounts of the iron group metals, i.e., iron, cobalt and nickel, may range between about 1% and 20% by weight, while the noble metals, e.g., palladium and platinum are normally employed in amounts ranging between about 0.1% and 2% by weight. The noble metals, particularly palladium and platinum, are normally preferred herein. Other metals such as rhenium may also be included.

When catalysts of the foregoing description are utilized for extended periods of time at temperatures of, e.g., 400°–950° F. in hydrocarbon conversions such as hydrocracking, hydrogenation, isomerization, reforming and the like, a progressive decline in catalyst activity normally occurs as a result of coke deposition. A more rapid or sudden decline in activity will normally follow when the catalyst encounters, either during hydrocarbon conversion or during regeneration, any of the adverse conditions of temperature and water vapor partial pressure previously described. Deactivation by coking is normally almost completely reversible by conventional oxidative regeneration at temperatures of e.g., 750°–1100° F. When it is found that such oxidative regeneration restores less than about 90% of the fresh hydrogenation activity, and less than about 90% of the fresh cracking activity, it may be assumed that some undesirable maldistribution of the metal content has occurred, such as to warrant use of the rejuvenation procedures described herein. It will be understood that hydrogenation activity is measured in terms of, and is inversely proportional to, the volume of catalyst required to effect a given degree of hydrogenation per pass of a particular compound, e.g., benzene, at a particular set of hydrogenation conditions. Cracking activity can be measured in terms of the standard Cat-A cracking activity index.

The following examples are cited to illustrate the invention, but are not to be construed as limiting in scope.

EXAMPLE I

This example illustrates a typical type of hydrothermal deactivation which can occur during catalytic hydrocracking. A hydrocracking run was carried out over a period of about twenty months utilizing a catalyst consisting of 0.5 weight-percent Pd supported on a Y molecular sieve cracking base having a $SiO_2/Al_2O_3$ mole-ratio of about 4.7, wherein about 35% of the zeolitic ion exchange capacity was satisfied by magnesium ions (3 weight-percent MgO), about 10% by sodium ions, and the remainder (55%) by hydrogen ions. This catalyst was maintained in a sulfided condition throughout the run by virtue of a sour recycle gas containing about 0.3 volume-percent of hydrogen sulfide. The run was carried out at a pressure of about 1500 p.s.i.g., with space velocities varying between about 1.3 and 1.7, hydrogen rates varying between 5,000 and 7,000 s.c.f./b., and with hydrocracking temperatures progressively increasing from about 500° F. to 680° F. The feedstock was a substantially sulfur- and nitrogen-free unconverted gas oil (400–850° F. boiling range) derived from a previous stage of hydrocracking. Hydrocracking temperatures were incrementally raised during the run to maintain 60–70 volume percent conversion per pass to gasoline.

During this run, a foaming problem was encountered in the recycle gas water-washing column, resulting in a substantial quantity of water being carried into the reactor, giving an estimated 100 p.s.i. partial pressure of water vapor therein for a period of about 4 hours. An immediate temperature increase of about 55° F. was required in order to maintain the desired conversion level, this temperature increase corresponding to a loss in catalytic activity of about 85%.

At the end of this run, the catalyst was carefully regenerated by oxidative combustion at temperatures ranging from about 700° up to 1000° F., utilizing a regeneration gas comprising oxygen in amounts increasing from about 0.1 to 3.0 volume percent, whereby water vapor partial pressures were maintained at a value below about 0.25 p.s.i.a. at all regeneration temperatures above 500° F. The regenerated catalyst was then tested for activity compared to that of the fresh catalyst. The feedstock used for the activity test was the same feed used in the previous hydrocracking run, doped with thiophene to a level of 0.48% sulfur to provide an $H_2S$-containing atmosphere for the hydrocracking. Conditions of the activity test were: pressure 1450 p.s.i.g., LHSV 1.7, hydrogen/oil ratio 8,000 s.c.f./b., conversion per pass 52–54 volume-percent to gasoline. The following table shows the temperatures required to maintain the above conversion as a function of time:

TABLE 1

| Hours | Fresh catalyst, °F. | Regenerated catalyst, °F. |
|---|---|---|
| 20 | 528 | 577 |
| 40 | 539 | 591 |
| 60 | 544 | 600 |
| 80 | 547 | 606 |
| 100 | 550 | 610 |
| 150 | 554 | 620 |
| 200 | 556 | 625 |
| 250 | 559 | 629 |
| 500 | 564 | 637 |
| 700 | 565 | 642 |

It will be noted that the regenerated catalyst required an initial hydrocracking temperature 49° higher than did the fresh catalyst indicating decreased cracking activity resulting presumably from migration of sodium and/or magnesium ions. Also, the regenerated catalyst declined much more rapidly in activity, requiring a 77° F. higher temperature at the end of 700 hours. The high deactivation rate of the regenerated catalyst clearly indicates a deficiency in hydrogenation activity resulting from a maldistribution of the palladium brought about during the above described process upset.

EXAMPLE II

A sample of the catalyst regenerated as described above was subjected to the hydration-ammoniation step of the present invention as follows:

(1) Allowed to hydrate in ambient air to a saturation value of about 25% by weight of water on a hydrated basis.
(2) Treated with gaseous ammonia at ambient temperatures and pressures to substantially saturate the water in the catalyst pores (about 25–30 weight-percent $NH_3$ based on water).
(3) Allowed to stand overnight in ambient air to volatilize most of the excess ammonia.
(4) Stripped and partially dried to a water content of about 6–8 weight-percent in a muffle furnace through which a stream of dry air was passed for two hours at temperatures increasing from ambient to 480° F., and then for two hours at 480° F.
(5) Calcined in the same muffle furnace while continuing the flow of dry air for one hour at temperatures increasing from 480° to 930° F., and then for one hour at 930 F.

The catalyst was then removed from the furnace and cooled in a sealed container. The activity test was carried out in the same manner as in Example I, with the following results:

TABLE 2

| Hours: | Temp. °F.[1] |
|---|---|
| 20 | 541 |
| 40 | 550 |
| 60 | 555 |
| 80 | 558 |
| 100 | 560 |
| 150 | 563 |
| 200 | 565 |
| 250 | 568 |

[1] For 52-54% conversion to 400° F. E.P. gasoline.

The foregoing data shows that the ammonia-rejuvenated catalyst of this example was almost as active as the original fresh catalyst; the required conversion temperatures leveled out at 100-250 hours to a value about 9-10° higher than the corresponding temperatures required for the fresh catalyst.

If the drying step (4) in the above example is omitted, and the catalyst simply calcined for one hour at temperatures from ambient to 930° F. followed by one hour at 930° F., the resulting catalyst is less active than the original regenerated catalyst of Example I, due to palladium agglomeration brought about by excessive water vapor partial pressures during the rapid heatup from ambient to 930° F.

EXAMPLE III

Another sample of the regenerated catalyst from Example I was subjected to the ammonium ion-exchange step of the present invention as follows:

(1) Slurried 100 g. of catalyst in one liter of 10% $NH_4NO_3$ solution, added acetic acid to give pH=3.5, stirred at 180° F. for two hours, filtered and washed.
(2) Step (1) repeated for a total of three exchanges.
(3) Final product dried and calcined as in step (5) of Example II. Analysis showed that the ion exchange had reduced the sodium content to 0.5% $Na_2O$ and the magnesium content to about 0.7% MgO.

Activity testing of this catalyst as described in Example I gave the following results:

TABLE 3

| Hours: | Temp. °F.[1] |
|---|---|
| 25 | 523 |
| 50 | 542 |
| 75 | 551 |
| 100 | 557 |
| 125 | 564 |
| 150 | 569 |
| 175 | 575 |

[1] For 52-54% conversion to 400° F. E.P. gasoline.

The above data shows that the ion-exchange technique alone provides a catalyst which is initially more active than the fresh catalyst of Example I or the ammoniated catalyst of Example II, but the activity rapidly declined so that after 150 hours it was substantially less active than the fresh catalyst or the ammoniated catalyst. It is hence apparent that neither treatment alone fully restored the fresh catalyst activity.

EXAMPLE IV

Another sample of the regenerated catalyst from Example I was first subjected to the ammonium ion-exchange treatment described in Example III and then to ammoniation as described in Example II. The same activity test gave the following results:

TABLE 4

| Hours: | Temp. °F.[1] |
|---|---|
| 50 | 516 |
| 75 | 524 |
| 100 | 529 |
| 125 | 532 |
| 150 | 535 |

[1] For 52-54% conversion to 400° F. E.P. gasoline.

It is thus evident that the combined treatments give a catalyst which is more active than the original fresh catalyst.

EXAMPLE V

The procedure of Example IV was repeated with the exception that the ammoniation step was performed first and the ion-exchange step second. The same activity test gave the following results:

TABLE 5

| Hours: | Temp. °F.[1] |
|---|---|
| 50 | 504 |
| 75 | 509 |
| 100 | 511 |
| 125 | 513 |
| 150 | 514 |

[1] For 52-54% conversion to 400° F. E.P. gasoline.

It is thus apparent that the ammoniation-ion exchange sequence gives a catalyst which is even more active, and which deactivates at a lower rate, than the catalyst rejuvenated by the reverse order of treatment.

For convenience, the essential data from the foregoing examples is tabulated as follows:

TABLE 6
Temp. (° F.) for 52-54% conversion to 400° F. E.P. gasoline

| | Example | | | | | |
|---|---|---|---|---|---|---|
| | I | I | II | III | IV | V |
| Catalyst treatment | Fresh | Regen. | $NH_3$-$H_2O$ | $NH_4NO_3$ | $NH_4NO_3$, $NH_3$-$H_2O$ | $NH_3$-$H_2O$, $NH_4NO_3$ |
| Hours: | | | | | | |
| 25 | | | | 523 | | |
| 40 | 539 | 591 | 550 | | | |
| 50 | | | | 542 | 516 | 504 |
| 75 | | | | 551 | 524 | 509 |
| 100 | 550 | 610 | 560 | 557 | 529 | 511 |
| 125 | | | | 564 | 532 | 513 |
| 150 | 554 | 620 | 563 | 569 | 535 | 514 |
| 200 | 556 | 625 | 565 | | | |
| 500 | 564 | 637 | | | | |
| 700 | 565 | 642 | | | | |

The foregoing details as to specific catalysts and rejuvenation conditions are not intended to be limiting in effect. The following claims and their obvious equivalents are intended to define the true scope of the invention.

We claim:

1. A method for rejuvenating a catalyst comprising a non-zeolitic Group VIII metal supported on a siliceous zeolite carrier which also contains zeolitic mono- and/or divalent metal ions, said catalyst having been subjected to thermal and/or hydrothermal conditions resulting in a mal distribution of said Group VIII metal on said carrier with resultant reduction in hydrogenation activity and in deleterious migration of said zeolitic metal cations resulting in a reduction in cracking activity, which comprises:
   (A) contacting said catalyst in an oxidized or sulfided state and at a temperature below about 300° F., with water or water vapor and with ammonia to effect a substantial hydration and ammoniation thereof, and thereafter drying and calcining said catalyst in an oxygen-containing gas to effect a substantially complete dehydration and deammoniation thereof; and
   (B) contacting said catalyst, in an oxidized or sulfided state with an aqueous ammonium salt solution to effect a substantial replacement of said zeolitic mono- and/or divalent metals with ammonium ions, and thereafter drying said catalyst.

2. A process as defined in claim 1 wherein step (A) is performed prior to step (B).

3. A process as defined in claim 1 wherein step (B) is performed prior to step (A).

4. A process as defined in claim 1 wherein said zeolitic monovalent and/or divalent metals comprise an alkali metal and/or an alkaline earth metal.

5. A process as defined in claim 1 wherein said drying and calcining in step (A) are performed by:
   (1) stripping the hydrated ammoniated catalyst in a stream of non-reducing gas at temperatures below about 500° F. to effect partial deammoniation and drying with removal of at least about one-half of the initial water content thereof; and
   (2) calcining the partially dried and deammoniated catalyst in a stream of oxygen-containing gas at temperatures controlled between about 500° and 1200° F. to maintain the dewpoint of the effluent gas stream below about 40° F., at least the terminal portion of said calcining being carried out at temperatures between about 750° and 1200° F. for a sufficient length of time to produce an effluent gas stream having a dewpoint below about 0° F. and a substantially completely dehydrated and deammoniated catalyst having improved hydrogenation activity.

6. A process as defined in claim 5 wherein said Group VIII metal is a Group VIII noble metal.

7. A process as defined in claim 1 wherein said siliceous zeolite carrier is a crystalline molecular sieve.

8. A method for rejuvenating a catalyst comprising a non-zeolitic Group VIII metal supported on a Y zeolite carrier which also contains zeolitic monovalent and/or divalent metal cations, said catalyst having previously been utilized in a hydrocarbon conversion process to substantial deactivation and subsequently regenerated by oxidative combustion, and during said hydrocarbon conversion and/or regeneration having been subjected to thermal and/or hydro thermal conditions resulting in a maldistribution of said Group VIII metal with resultant reduction in hydrogenation activity, and in a deleterious migration of said zeolitic cations resulting in a reduction in cracking activity, which comprises:
   (A) contacting said catalyst in an oxidized or sulfided state and at a temperature below about 300° F., with water or water vapor and with ammonia to effect a substantial hydration and ammoniation thereof, and thereafter drying and calcining said catalyst in an oxygen-containing gas to effect a substantially complete dehydration and deammoniation thereof; and
   (B) contacting said catalyst, in an oxidized or sulfided state with an aqueous ammonium salt solution to effect a substantial replacement of said zeolitic mono- and/or divalent metals with ammonium ions, and thereafter drying said catalyst.

9. A process as defined in claim 8 wherein step (A) is performed prior to step (B).

10. A process as defined in claim 8 wherein step (B) is performed prior to step (A).

11. A process as defined in claim 8 wherein said drying and calcining in step (A) are performed by:
    (1) stripping the hydrated ammoniated catalyst in a stream of non-reducing gas at temperatures below about 500° F. to effect partial deammoniation and drying with removal of at least about one-half of the initial water content thereof; and
    (2) calcining the partially dried and deammoniated catalyst in a stream of oxygen-containing gas at temperatures controlled between about 500° and 1200° F. to maintain the dewpoint of the effluent gas stream below about 40° F., at least the terminal portion of said calcining being carried out at temperatures between about 750° and 1200° F. for a sufficient length of time to produce an effluent gas stream having a dewpoint below about 0° F. and a substantially completely dehydrated and deammoniated catalyst having improved hydrogenation activity.

12. A process as defined in claim 11 wherein said Group VIII metal is a noble metal.

References Cited

UNITED STATES PATENTS

| | | | |
|---|---|---|---|
| 3,239,471 | 3/1966 | Chin et al. | 252—455 Z |
| 3,373,110 | 3/1968 | Chen | 252—455 Z |
| 3,423,332 | 1/1969 | Maher et al. | 208—120 |
| 3,287,282 | 11/1966 | Stiles | 208—111 |
| 3,392,124 | 7/1968 | Laurent | 252—455 Z |

DANIEL E. WYMAN, Primary Examiner

P. E. KONOPKA, Assistant Examiner

U.S. Cl. X.R.

208—111, 120; 252—411, 419, 455 Z